(12) United States Patent
Wen-Hsiang (10) Patent No.: US 6,753,852 B1
(45) Date of Patent: Jun. 22, 2004

(54) PC SYSTEM WITH WIRELESS COMMUNICATION CAPABILITY

(76) Inventor: Yueh Wen-Hsiang, 3rd. Fl. No. 7-2, Lane 46, Chungcheng St., Hsinchuang City, Taipei (TW)

( * ) Notice: Subject to any disclaimer, the term of this patent is extended or adjusted under 35 U.S.C. 154(b) by 516 days.

(21) Appl. No.: 09/603,893

(22) Filed: Jun. 26, 2000

(30) Foreign Application Priority Data

Sep. 30, 1999 (TW) ......................................... 88116814 A (51) Int. Cl.$^7$ .............................. G09G 5/00; G09G 5/08
(52) U.S. Cl. ......................... 345/169; 345/156; 345/158
(58) Field of Search .............................. 345/156, 157, 345/158, 163, 165, 167, 168, 169; 701/33, 99; 364/424.01, 424.03, 424.04, 500; 725/131, 133, 139, 141, 151, 153

(56) References Cited

U.S. PATENT DOCUMENTS 5,850,209 A  * 12/1998  Lemke et al. ............... 345/156
5,990,868 A  * 11/1999  Frederick .................... 345/158
6,078,789 A  *  6/2000  Bodenmann et al. ......... 455/66
6,249,914 B1 *  6/2001  Harrison et al. ............ 725/141

* cited by examiner

Primary Examiner—Vijay Shankar
(74) Attorney, Agent, or Firm—Bacon & Thomas, PLLC (57) ABSTRACT

A wireless communication device for personal computer system includes a main unit wireless transmission device and a peripheral wireless transmission device, such that the two device can engage in two-way signal communications with each other. The main unit wireless transmission device is connected with interface of the main unit, and the peripheral transmission device is connected with connecting cables of the monitor, keyboard, and mouse, so that signals can be communicated between the monitor, keyboard, and mouse and the main unit.

20 Claims, 6 Drawing Sheets

PC SYSTEM WITH WIRELESS COMMUNICATION CAPABILITY

FIELD OF THE INVENTION

This present invention relates to a portable computer peripheral communication implementation; specifically to a portable peripheral device that comprises the monitor, keyboard and mouse of a traditional desktop personal computer.

DESCRIPTION OF THE PRIOR ART

Figure 1:
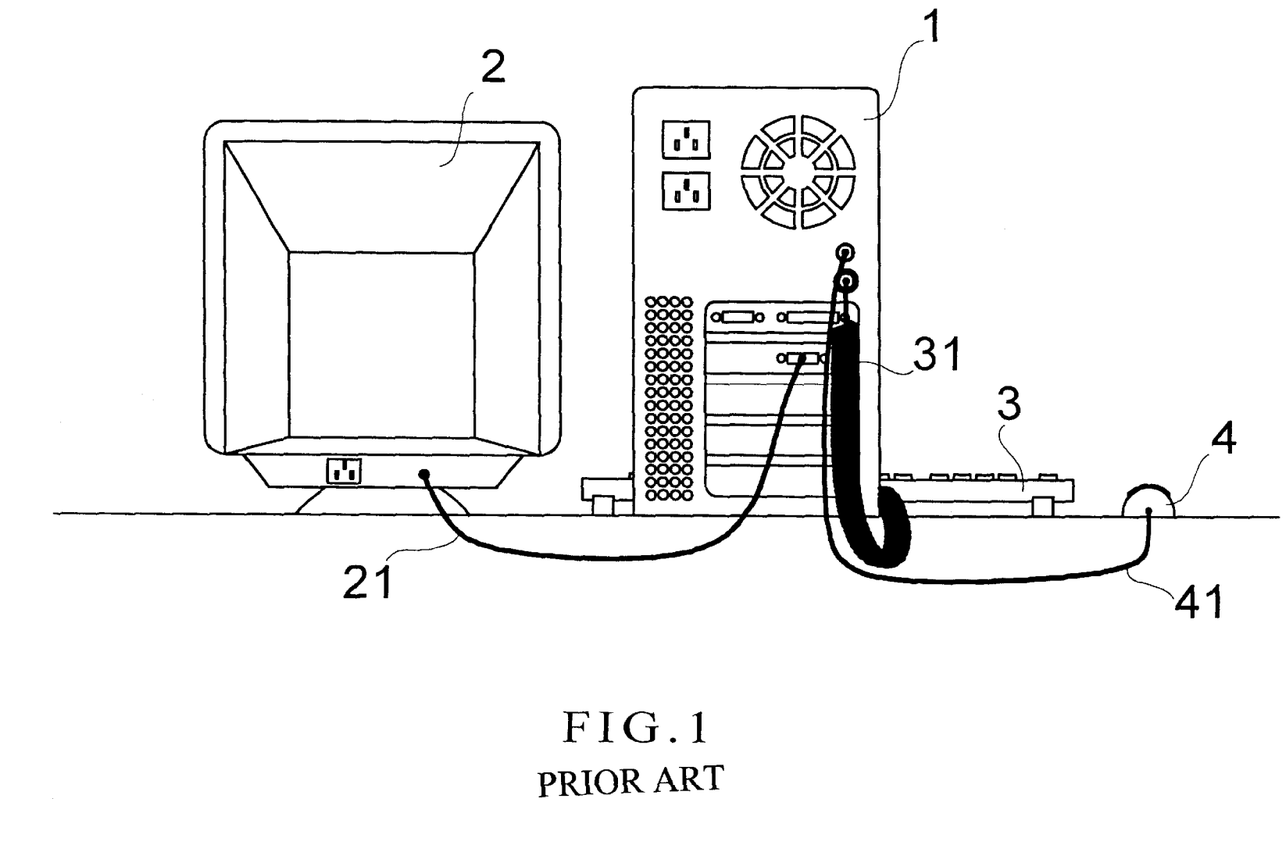
FIG. 1. A rear view of a desktop PC system.

Current desktop computer systems include the main unit, monitor, keyboard and mouse as a set. Cables are used between various parts for signal communications. FIG. 1 shows a rear view of a desktop PC system. The connections between the main unit and respectively the monitor 2, keyboard 3 and mouse 4 are achieved by video cable 21, keyboard cable 31 and mouse cable 41. With the two additional power cables of the main unit and monitor (not shown), the system is cluttered with various cables in the rear, which is untidy and unpleasant to view.

When using a PC, an user spends most of his time working on the keyboard and mouse and viewing the monitor screen, and little time using the floppy disc or CD-ROM drives. As such, the monitor, keyboard and mouse are generally placed on top of the desk with the main unit tucked underneath the table, so as not to occupy additional desktop space. However, due to the connecting cables, various peripherals are tethered to the main unit, making it a cumbersome arrangement. The present invention provides a wireless communication implementation whereby peripherals such as the monitor, keyboard and mouse become mobile so as to increase the practicality of the PC system.

The primary object of the present invention is for providing a wireless communication implementation that replaces cable signal connections for PC systems.

An alternative object of the present invention is providing a PC system with monitor, keyboard and mouse independent of the main unit where signals can still be communicated by wireless two-way communications.

SUMMARY OF THE INVENTION

In response to the call for ever more user-friendly PC systems, the present invention provides a wireless communication implementation that comprises wireless transmission device at the main unit end and wireless transmission device at the peripheral end, where the two devices can engage in two-way wireless signal communications. Said device at the main unit comprises a video connector, a keyboard connector and a mouse connector, which can respectively interface with the video card or video processor, keyboard or mouse of the main unit; and said device at the peripheral end comprises a video plug-in, a keyboard plug-in and a mouse plug-in, which can respectively receive connecting cables for the monitor, keyboard and mouse. In this manner, said peripherals can engage in wireless signal communications with the main unit.

An additional embodiment is provision of PC system with wireless capability, wherein the main unit comprises wireless capability for transmitting and receiving video, keyboard and mouse signals, and the LCD monitor, keyboard and mouse are packaged as a notebook with wireless capability for transmitting and receiving said video, keyboard and mouse signals.

BRIEF DESCRIPTION OF THE DRAWINGS

The many strengths and characteristics of the present invention may be further elaborated by the use of following figure.

DETAILED DESCRIPTION OF THE INVENTION

The wireless communication implementation of the present invention comprises a wireless transmission device at the main unit end and one at the peripheral end. With respect to conventional PC systems where cables are needed to connect the main unit with the peripherals, as shown in FIG. 1, in one embodiment, a wireless device is mounted next to the main unit for transmitting and receiving output monitor signals and input keyboard and mouse signals between the main unit and said peripherals. The wireless device at the peripheral end transmits and receives signals to and from the main unit. By these two devices, wireless two-way communication is achieved with the main unit spatially separated from the peripherals, for enhanced ease of use.

Figure 2:
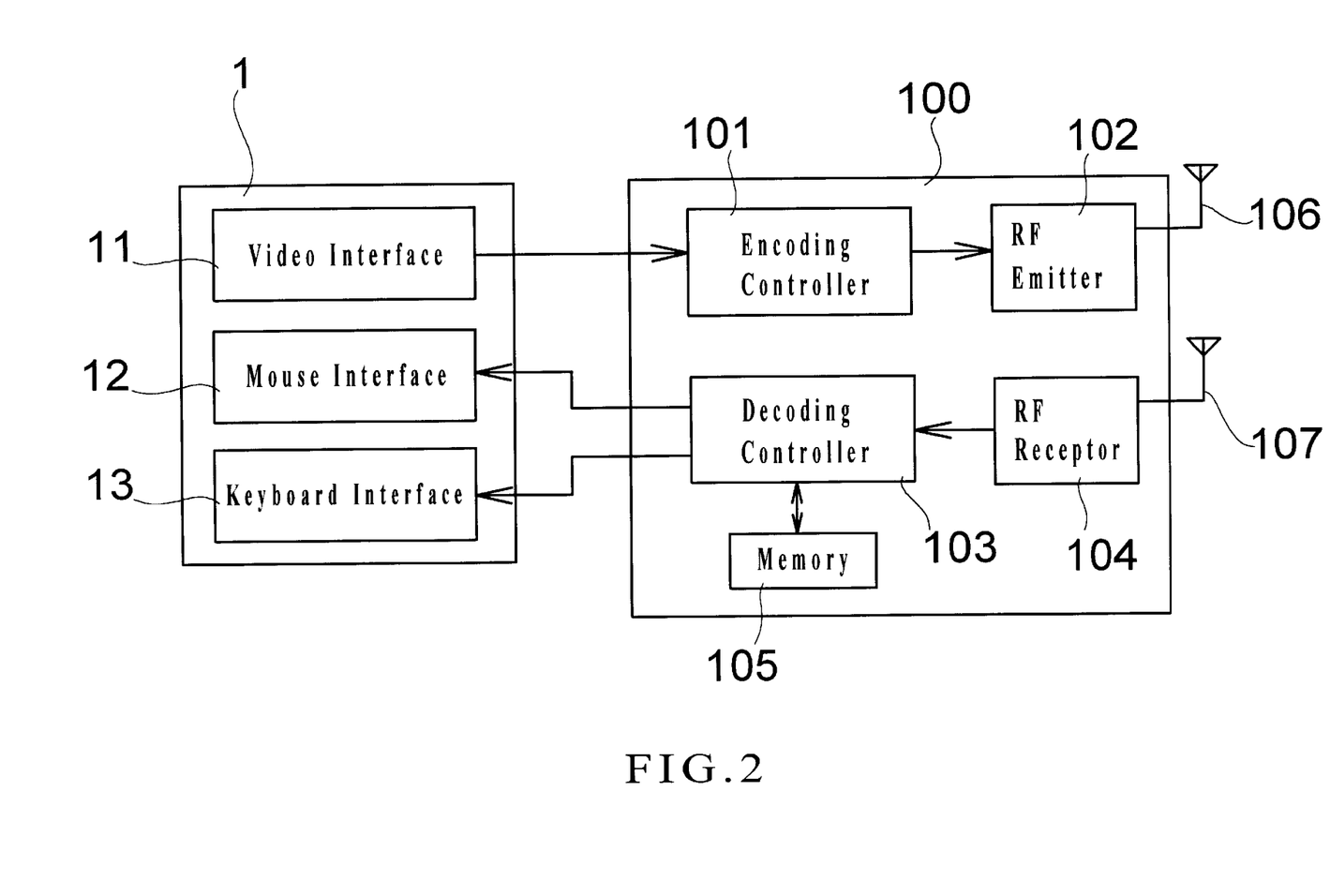
FIG. 2. A block diagram of the wireless transmission device at the main unit.

Referring to FIG. 2, the main unit 1 contains respective interfaces for videos image output 11, mouse input 12 and keyboard input 13. Said video interface 11 is a video card or a video processor embedded in the motherboard that outputs videos signals via a connector. Said mouse interface 12 can be a COM1 port, PS2 or USB port. Said keyboard interface 13 can be a keyboard input connector or USB port.

The wireless transmission device 100 at the main unit comprises a video data transmission channel and a serial data reception channel. Said video data transmission channel comprises a encoding controller 101, RF emitter 102 and antenna 106, wherein the encoding controller 101 encodes signals received from video interface 11 of the main unit 1, and thereafter the encoded signals output from the encoding controller 101 are modulated by the RF emitter 102 and then emitted through the antenna 106. The wireless transmission can be effectuated by the conventional modulation/demodulation method. Said serial data reception channel comprises a decoding controller 103, memory 105, RF receptor 104 and antenna 107, wherein the RF receptor 104 receives, via antenna 107, radio signals emitted from the peripheral wireless transmission device 200, and demodulates said signals into digital form for input to decoding controller 103, which then decodes the signals with memory 105 for temporary data storage. Decoded mouse and keyboard input signals are then forwarded to mouse interface 12 and keyboard interface 13 of the main unit 1.

In this embodiment, the encoding controller 101 can be implemented by using an encoder, digital signal processor (DSP) and control circuits. The decoding controller 103 can be implemented by using a decoder, digital signal processor and control circuits. These two units respectively effectuate video data transmission and serial data reception.

Figure 3:
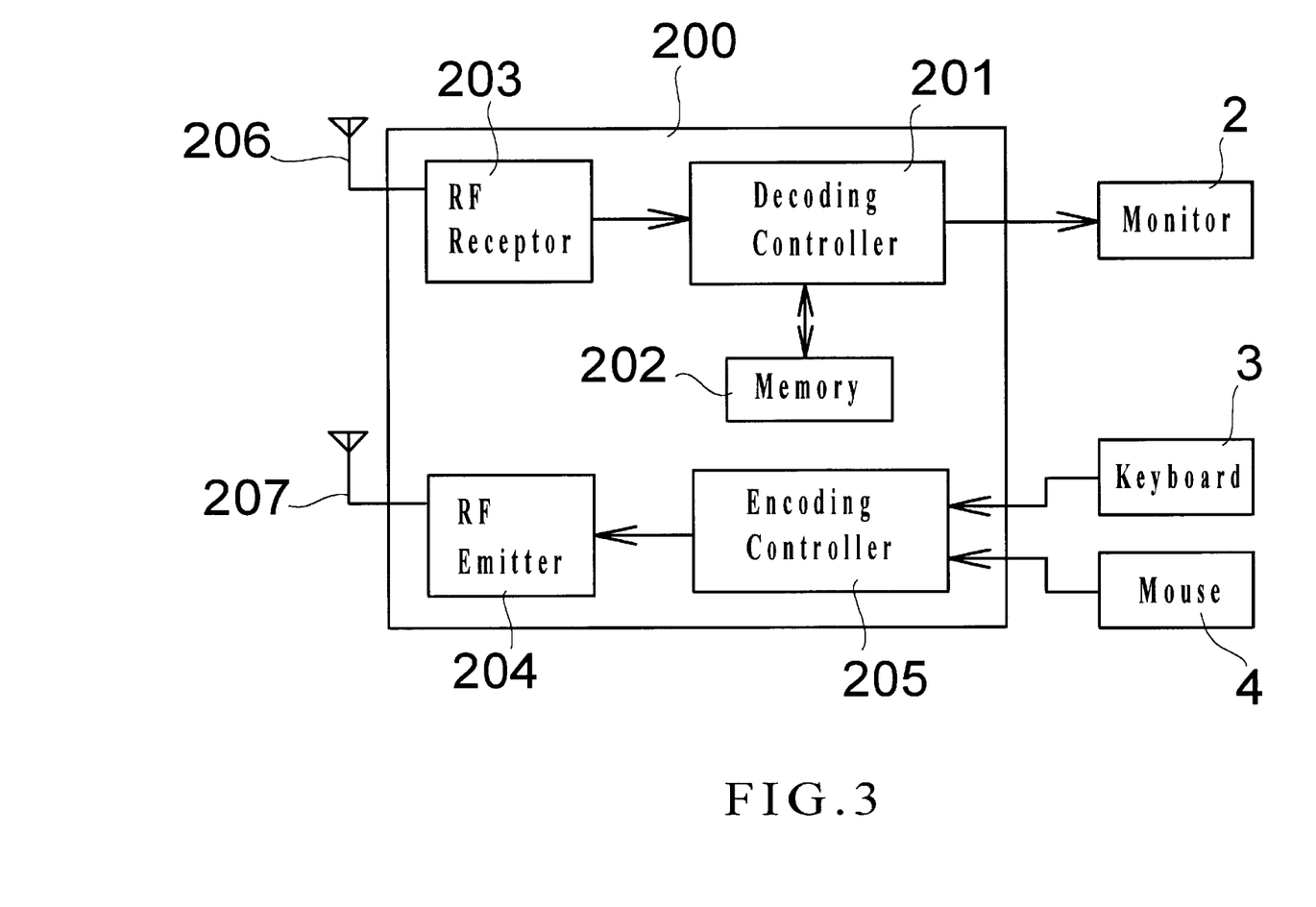
FIG. 3. A block diagram of the wireless transmission device at the peripheral end.

Referring to FIG. 3, where the peripherals of monitor 2, keyboard 3 and mouse 4 are connected via cables to the main unit 1. The peripheral wireless transmission device 200, which can accommodate monitor, keyboard and mouse connection cables of reference numerals 21, 31 and 41, comprises a data reception channel and a serial data transmission channel. Said data reception channel comprises a decoding controller 201, memory 202, receptor 203 and antenna 206, wherein the receptor 203 receives, via antenna 206, signals emitted from main unit wireless transmission device 100, decodes said signals into digital form, and then forwarding the same to the decoding controller 201, which then decodes the signals using memory 202 for temporary data storage. The decoded signals are then output through video interface 11, via cable 21, to monitor 2. The serial data transmission channel comprises a encoding controller 205, an emitter 204 and antenna 207, wherein the encoding and control unit 205 receives, via keyboard and mouse cables 31 and 41, signals and encodes such signals; the encoded signals are then modulated by emitter 204 and emitted through antenna 207.

In this embodiment, the encoding controller 205 can be implemented by using a encoder, a DSP and control circuits. The decoding controller 201 can be implemented by using a decoder, a DSP and control circuits. These two units respectively effectuate video data transmission and serial data reception.

Figure 4:
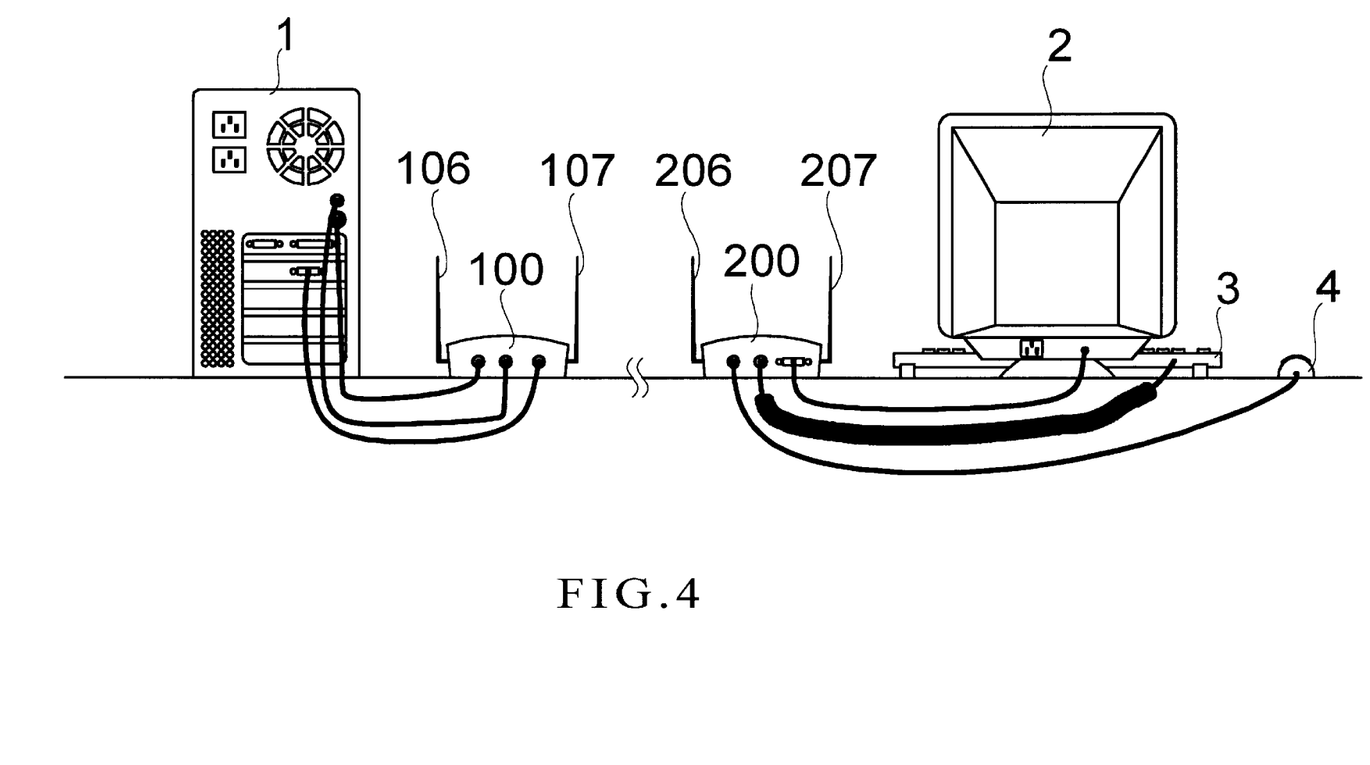
FIG. 4. Schematic of first embodiment of the present invention.
Figure 5:
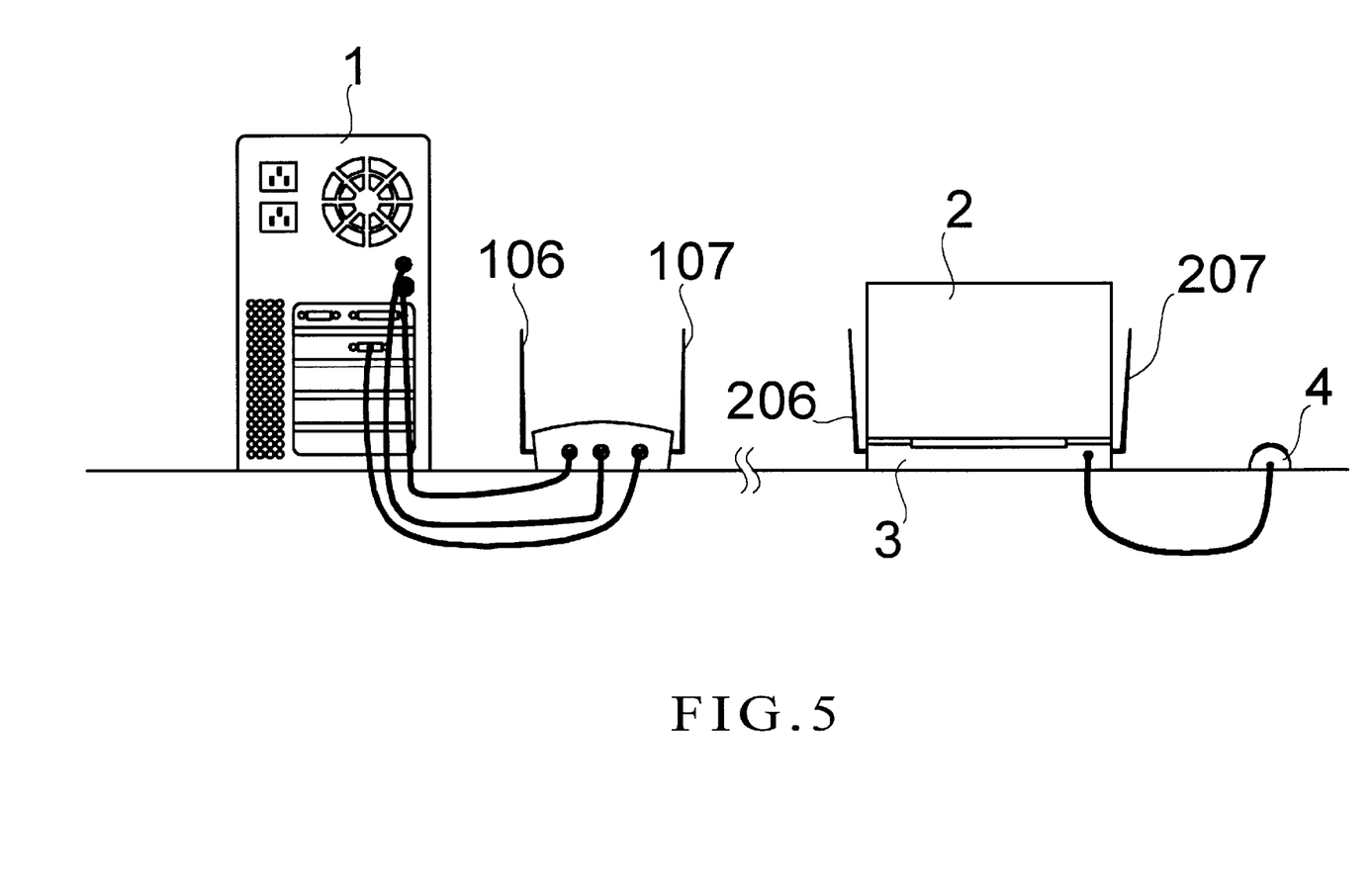
FIG. 5. Schematic of second embodiment of the present invention.

Specifically, in the above embodiment, with respect to a conventional PC system, in which the main unit is connected to the monitor, keyboard and mouse via cables, signals from peripherals can be communicated between the main unit and the main unit wireless transmission device. Similarly, by plugging in the monitor, keyboard and mouse connecting cables into peripheral wireless transmission device, the two wireless transmission devices can effectuate two-way wireless communications, so that peripherals such as the monitor, keyboard and mouse can be far removed from the main unit for more practicality, as shown in FIG. 4. Moreover, with the continued development of LCD monitor technology, LCD monitors become more competitive in the market; and it is foreseeable that LCD monitors can one day replace cathode-ray tube monitors in the near future. The LCD monitor may combine with keyboard and mouse into one notebook package, which can connect with the main unit with a single cable. A desktop PC system so formed can implement the embodiment aforementioned, so that not only the peripherals can be far removed from the main unit, the peripheral wireless transmission device can combine physically with said notebook package of LCD monitor, keyboard and mouse so as to provide desktop PC users similar convenience as if working with a notebook computer, as shown in FIG. 5.

Figure 6:
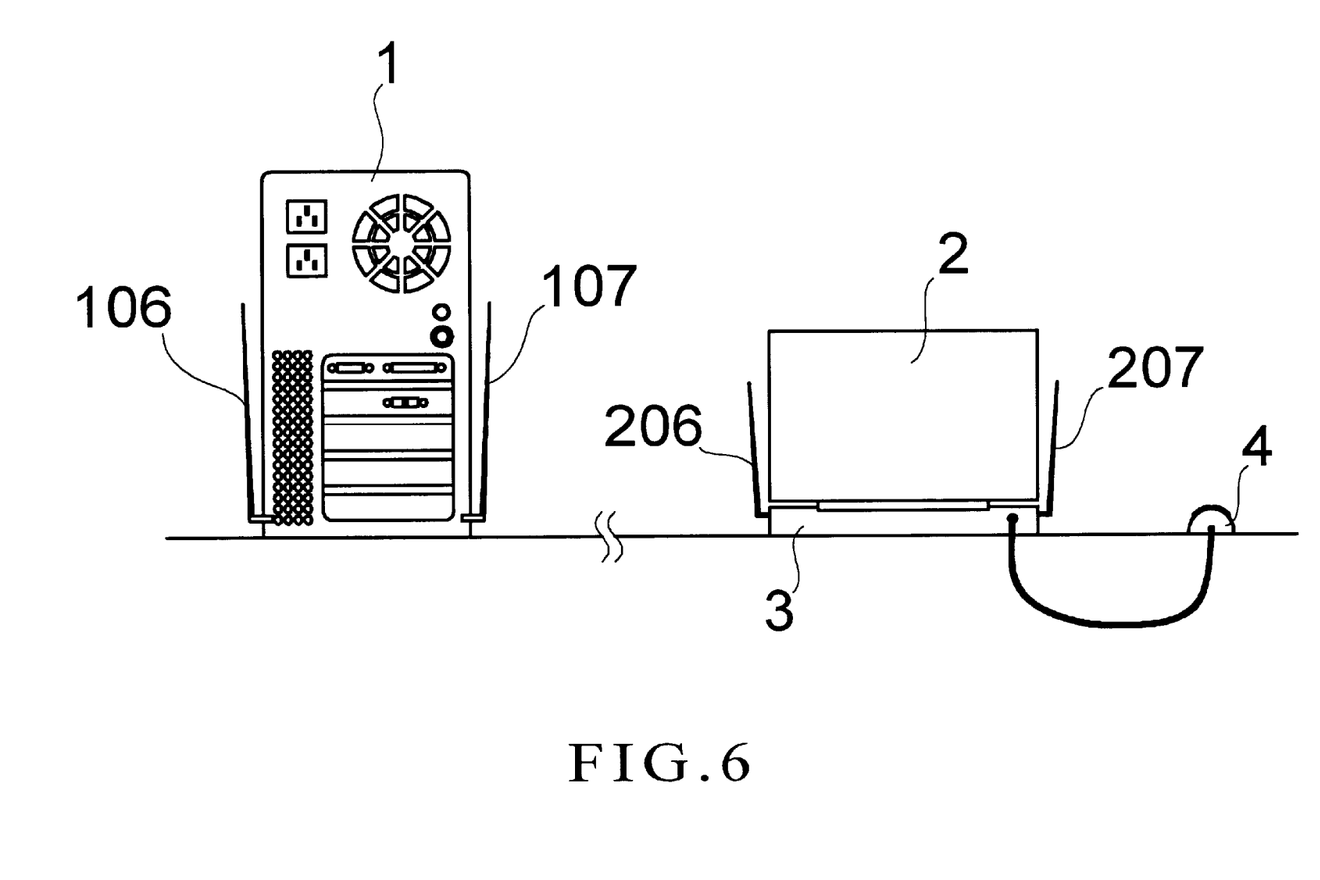
FIG. 6. Schematic of third embodiment of the present invention.

Furthermore, with advancing technology in computer chips and motherboards, a further desktop PC system model, wirelessly enabled by the present invention, can be implemented. Such system comprises the main unit and peripheral notebook which is a combination of a LCD monitor and keyboard connecting with or incorporating a mouse as shown in FIG. 6. By implementing present invention, both the main unit and the peripherals can become wirelessly capable for two-way signal communications.

After detailed discussion of the best mode embodiment of the present invention, those skilled in this art may clearly comprehend this invention and can make further modifications without departing from the scope and spirit of the claims. The present invention is not limited to the embodiment modes described in the specification.

EFFECTIVENESS OF THE INVENTION

A desktop PC system implemented with present invention should improve upon the convention desktop PC systems in terms of portability and ease of use, such that the locations of the monitor, keyboard and mouse are no longer necessarily tethered to the main unit. In this manner, it provides an improvement on the user-friendliness of the desktop PC systems.

What is claimed is:

1. A wireless communication device for use in PC system, said wireless communication device comprising:
   a wireless transmission device connected by a wired connection to a main unit, said wireless transmission device connected by a wired connection to the main unit being arranged to receive a video signal from the main unit and to transmit a keyboard signal and a mouse signal to said main unit, and said wireless transmission device at the main unit comprising a video data transmission unit that receives, encodes and modulates said video signal into a radio signal for wireless emission, and a serial data reception unit that receive, demodulates and decodes radio signals into said keyboard and said mouse signal; and
   a wireless transmission device connected by a wired connection to a peripheral unit, said wireless transmission device connected by a wired connection to the peripheral unit being arranged to receive said keyboard signal and said mouse signal from a keyboard and a mouse, respectively, and transmit said video signal to a monitor, said wireless transmission device at the peripheral unit comprising a video data reception unit that receive, demodulates and decodes a radio signal emitted by said video data transmission unit into said video signal, and a serial data transmission unit that receives, encodes and modulates said keyboard signal and said mouse signal into radio signal for emission.

2. A wireless communication device as recited in claim 1, wherein said video data transmission unit comprises an encoding controller and an RF emitter, such that said encoding controller receives and encodes said video signal from said main unit, and then forwards encoded said video signal to said RF Emitter for modulation into said radio signal emitted by said video data transmission unit.

3. A wireless communication device as recited in claim 1, wherein said serial data reception unit comprises a decoding controller, a memory and a RF receptor, such that said RF receptor receives and demodulates radio signals and then forwards resulting signals to said decoding controller, which then decodes for said keyboard and mouse signals, and said memory provides temporary data storage for said decoding controller.

4. A wireless communication device as recited in claim 1, wherein said video data reception unit comprises a decoding controller, a memory and an RF receptor, such that said RF receptor receives and demodulates radio signals and then forwards resulting signals to said decoding controller, which then decodes for said video signal, and said memory provides temporary data storage for said decoding controller.

5. A wireless communication device as recited in claim 1, wherein said serial data transmission unit comprises an encoding controller and an RF emitter, such that said encoding controller receives and encodes said keyboard and mouse signals and then forwards resulting signals to said emitter for modulation into radio signals for emission.

6. A wireless communication device as recited in claim 2 or 5, wherein said encoding controller comprises a digital signal processor.

7. A wireless communication device as recited in claim 3 or 4, wherein said decoding controller comprises a digital signal processor.

8. A wireless communication device for use in a PC system, where said PC system comprises a main unit, a monitor, a keyboard and a mouse, and said device comprises:
   a wireless transmission device connected by a wired connection to the main unit, said wireless transmission device connected by a wired connection to the main unit comprising a video data transmission unit for receiving, encoding and modulating a video signal from said main unit into a radio signal for emission; and a serial reception unit for receiving, demodulating and decoding radio signals into a keyboard signal and a mouse signal, where said keyboard and mouse signals are then forwarded to said main unit; and a wireless transmission device connected by a wired connection to the peripheral unit, said wireless transmission device connected by a wired connection to the peripheral unit comprising a video data reception unit for receiving, demodulating and decoding said radio signal emitted by said video data transmission unit into said video signal which is then forwarded to said monitor; and a serial transmission unit for receiving, encoding and modulating said keyboard and mouse signals outputted by said keyboard and mouse into radio signals for emission;

said wireless transmission devices connected by wired connections to the main unit and the peripheral unit being arranged to carry out two-way wireless communications, such that signals can be communicated between said main unit and said monitor, keyboard and mouse.

9. A wireless communication device as recited in claim 8, wherein said video data transmission unit comprises an encoding controller and an RF emitter, such that said encoding controller receives and encodes said video signal from the main unit, and then forwards encoded said video signal to said RF emitter for modulation into said radio signal for emission.

10. A wireless communication device as recited in claim 8, wherein said serial data reception unit comprises a decoding controller, a memory and an RF receptor, such that said RF receptor receives and demodulates radio signals emitted by said serial transmission unit and then forwards resulting signals to said decoding controller, which then decodes for said keyboard and mouse signals, and said memory provides temporary data storage for said decoding controller.

11. A wireless communication device as recited in claim 8, wherein said video data reception unit comprises a decoding controller, a memory and an RF receptor, such that said RF receptor receives and demodulates said radio signal emitted by said video data transmission unit and then forwards a resulting signal to said decoding controller, which then decodes the resulting signal for said video signal, and said memory provides temporary data storage for said decoding controller.

12. A wireless communication device as recited in claim 8, wherein said serial data transmission unit comprises an encoding controller and an RF emitter, such that said encoding controller receives and encodes said keyboard and mouse signals and then forwards resulting signals to said RF emitter for modulation into radio signals for emission.

13. A wireless communication device as recited in claim 9 or 12, wherein said encoding controller comprises a digital signal processor.

14. A wireless communication device as recited in claim 10 or 11, wherein said decoding controller comprises a digital signal processor.

15. A personal computer system with wireless communication capability, which comprises:

a main unit having a video output interface and a keyboard input interface;

a peripheral device, comprising a liquid crystal display monitor and a keyboard;

a wireless transmission device connected by a wired connection to the main unit, comprising a video data transmission unit for receiving, encoding and modulating video signals from said video output interface into radio signals for emission; and a serial reception unit for receiving, demodulating and decoding radio signals for keyboard signals, where said keyboard signals are then forwarded to said keyboard input interface; and a wireless transmission device connected by a wired connection to the peripheral device, comprising a video data reception unit for receiving, demodulating and decoding radio signals emitted by said video data transmission unit into said video signals, which are then forwarded to said liquid crystal display monitor; and a serial data transmission unit for receiving, encoding and modulating said keyboard signals into radio signals for emission;

said wireless transmission devices connected by wired connections to the main unit and the peripheral device being capable of two-way communications, such that signals can be communicated between said main unit and said peripheral device.

16. A wireless communication device as recited in claim 15, wherein said main unit further comprises a mouse input interface, and said peripheral device further comprises a mouse device.

17. A wireless communication device as recited in claim 16, wherein said serial data transmission unit is able to receive, encode and modulate signals from said mouse device into radio signals for emission, and said serial data reception unit is able to receive, demodulate and decode radio signals for mouse signals, which are then forwarded to said mouse input interface.

18. A personal computer system with wireless communication capability, which comprises:

a main unit having a video output interface, a keyboard input interface and a wireless transmission unit connected by a wired connection to the main unit;

said wireless transmission unit connected by a wired connection to the main unit comprising an encoding controller for receiving and encoding video signals from said video output interface, an RF emitter for modulating said encoded radio signals into first signals, and a decoding controller for receiving and decoding said first signals for keyboard signals, which are then forwarded to said keyboard input interface; and a peripheral wireless transmission unit comprising an RF receptor for receiving and demodulating radio signals into second signals, a decoding controller for receiving and decoding said second signals into said video signals which are then forwarded to a liquid crystal display monitor, an encoding controller for receiving and encoding said keyboard signals from said keyboard, and an RF emitter for modulating said encoded keyboard signals into radio signals for emission;

said wireless transmission unit connected by a wired connection to the main unit and said peripheral wireless transmission unit being arranged to carry out two-way wireless communications, such that signals can be communicated between said main unit and said peripheral device.

19. A personal computer system as recited in claim 18, wherein said main unit further comprises a mouse input interface, and said peripheral device comprises a mouse device.

20. A personal computer system as recited in claim 19, wherein said encoding signals of said peripheral wireless transmission unit is able to receive and encode signals from said mouse device, which are then modulated by said RF emitter of said peripheral wireless transmission unit into radio signals for emission, and said RF receptor of said wireless transmission unit at main unit is able to receive and demodulate radio signals, which are then decoded by said decoding controller of said wireless transmission unit at main unit for said mouse signals, which are then forwarded to said mouse input interface.

* * * * *